119,594

UNITED STATES PATENT OFFICE.

HENRY FOUST, OF MILL VILLAGE, PENNSYLVANIA.

IMPROVEMENT IN ANIMAL-TRAPS.

Specification forming part of Letters Patent No. 119,594, dated October 3, 1871.

*To all whom it may concern:*

Be it known that I, HENRY FOUST, of Mill Village, in the county of Erie and State of Pennsylvania, have invented a new and Improved Animal-Trap; and I do hereby declare the following to be a full, clear, and exact description of the same, reference being had to the accompanying drawing forming part of this specification, in which—

Figure 1 is a perspective view, and Fig. 2 a longitudinal section of the trap.

Similar letters of reference in the accompanying drawing denote the same parts.

My invention has for its object to provide a simple, cheap, convenient, and effective animal-trap of that class which is designed for catching rats and mice; and to this end it consists in the improved construction and arrangement of all the parts constituting the trap, as I will now proceed to describe.

In the accompanying drawing, A is the body of the trap, composed of sheet metal, with a rounded top and a rectangular or quadrangular base. The bottom of the body is open, and across it extend two bars or strips, one, B, near the center, and the other, C, near one end, and slightly raised above the lower edge of the body. D is the tilting-platform, pivoted to the sides of the body immediately over the transverse bar B, one end being weighted to rest upon the bar C. E is the entrance, formed in one of the sides at the weighted end of the tilting-platform; and F is the bait-box, secured to the opposite end of the body, upon the outside. It is provided with a hinged cover, G, and communicates with the interior of the body through an opening, H, formed in the end, as shown in the drawing. The trap thus constructed is mounted upon a water vessel, I, and hinged at one edge thereto, so as to open for access to the interior of both. The trap and water vessel are locked in a closed position by means of a spring-catch, J, upon the side opposite the hinges.

The operation is as follows: The animal, attracted by the bait in the box F, enters the trap through the opening E and advances along the tilting-platform toward the bait-opening H until his weight overcomes the weighted end of said platform, when the latter is tilted, precipitating the animal into the vessel I, which may be partially filled with water. The platform is immediately carried back to a horizontal position by the gravity of its weighted end, and the trap is thereby automatically set for the entrance of another animal, the position of the platform forming a door or cut-off to prevent the escape of the animal already within the water vessel. As the platform is tilted its under surface comes in contact with the inner end of the cross-bar B, by which it is prevented from tipping so far forward that the weighted end will not return it to a horizontal position.

The rear end of the water vessel is inclined, as shown, its upper end terminating at a point immediately in rear of the cross-bar B. By this arrangement the space between such cross-bar and inclined end is so far reduced that an animal in the water-box cannot pass upward therein to escape through the opening E when the weighted end of the platform is raised in tilting. This result could not be attained if the end of the box was made vertical or in line with the body A, as sufficient space would thereby be formed to permit the passage of the animal upward to the opening E. A still further advantage arising from the employment of the wide bar B is found in the fact that, when the platform is tilted under the weight of an animal, the shock caused by its sudden contact with said bar prevents the animal from turning or retracing his steps, and shakes loose any hold he may have obtained upon the edges of the platform or bait-opening.

If desired, the upper surface of the platform at the opening E may be provided with two or more short pointed studs or pins, so that an animal having partly entered such opening cannot return, but must continue until completely within the trap.

The contents of the water vessel are removed by lifting the trap upon its hinges, as will be readily understood.

Having thus described my invention, what I claim as new is—

The animal-trap, consisting of the body A and water vessel I, hinged together, the former provided with the entrance E, exterior bait-box F, and the tilting-platform D, and the latter with the inclined rear end, as herein shown and described, for the purpose specified.

HENRY FOUST

Witnesses:
 ENOCH BEARDSLEY,
 G. W. GELLETT.

(51)

*George French.*
*Turn Table for Transferring Freight.*
No. 119,595. Patented Oct. 3, 1871.
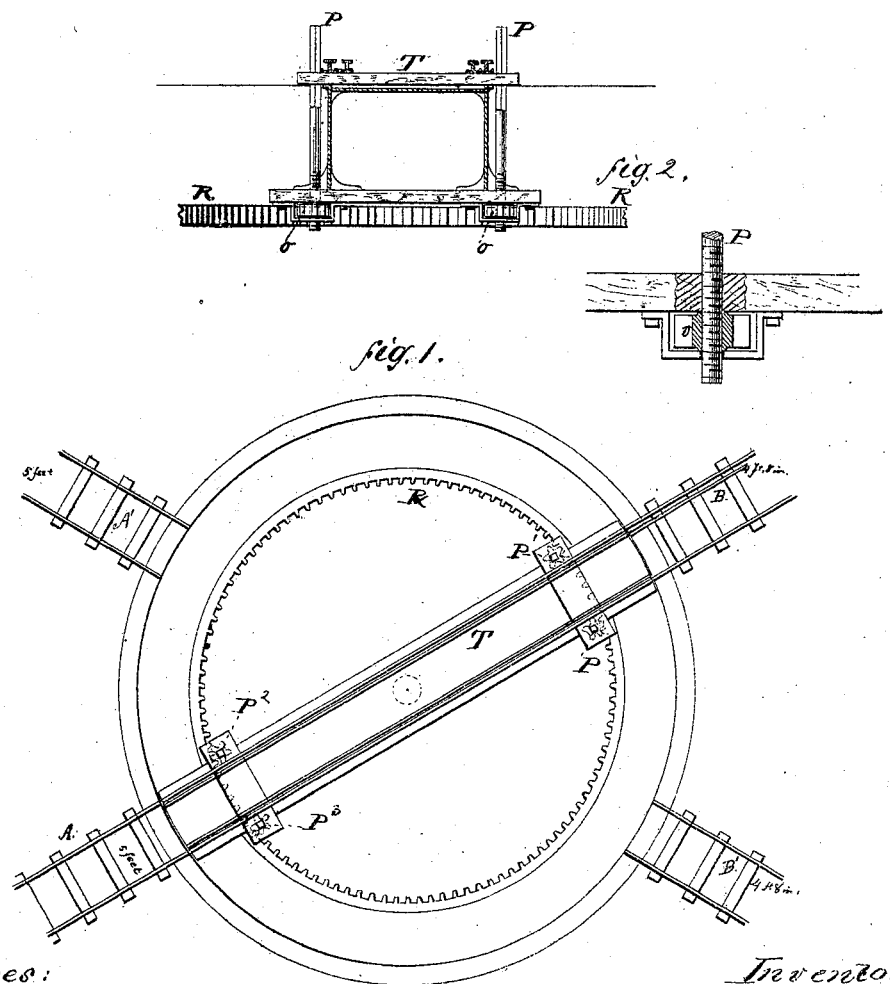
Witnesses:
Victor Hagmann
A.C. Rawlings
Inventor:
George French
By Hill & Ellsworth
attys.